US012607272B2

(12) United States Patent (10) Patent No.: US 12,607,272 B2

Molinelli (45) Date of Patent: Apr. 21, 2026

(54) VALVE

(71) Applicant: Microtecnica S.r.I., Turin (IT)

(72) Inventor: Dario Molinelli, Carnate (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 18/820,967

(22) Filed: Aug. 30, 2024

(65) Prior Publication Data

US 2025/0092956 A1 Mar. 20, 2025

(30) Foreign Application Priority Data

Sep. 19, 2023 (EP) ..................................... 23198370

(51) Int. Cl.
F16K 17/04 (2006.01)
B01D 35/147 (2006.01)

(52) U.S. Cl.
CPC .......... F16K 17/04 (2013.01); B01D 35/1475 (2013.01); B01D 2201/167 (2013.01)

(58) Field of Classification Search
CPC ................. F16K 17/04; F16K 17/0433; F16K 2200/501; F16K 1/50; F16K 27/0209; F16K 47/0111; B01D 35/1475; B01D 2201/167
See application file for complete search history.

(56) References Cited

U.S. PATENT DOCUMENTS

| | | | | |
|---|---|---|---|---|
| 3,578,019 A | * | 5/1971 | Turolla | ............... F16K 17/0433 |
| | | | | 251/360 |
| 4,064,906 A | * | 12/1977 | Berg | ..................... F16K 17/044 |
| | | | | 137/538 |
| 4,172,582 A | | 10/1979 | Bobnar | |
| 4,889,472 A | * | 12/1989 | Decker | ................... F04B 9/115 |
| | | | | 417/46 |

(Continued)

FOREIGN PATENT DOCUMENTS

| | | | | |
|---|---|---|---|---|
| CN | 108413085 A | 8/2018 | | |
| CN | 113236827 A | * 8/2021 | ........... F16K 27/029 |

(Continued)

OTHER PUBLICATIONS

CN 113236827 english text translation (Year: 2021).*

(Continued)

*Primary Examiner* — Patrick C Williams

(74) *Attorney, Agent, or Firm* — CANTOR COLBURN LLP

(57) ABSTRACT

An assembly for a pressure relief valve includes a valve seat member, a piston and a fluid outlet. The valve seat member includes a fluid inlet, a seat sealing surface and an axial bore. The axial bore includes a first cavity and a second cavity. The seat sealing surface is disposed axially between the first cavity and the second cavity and the fluid inlet is disposed axially between the seat sealing surface and the second cavity. The piston is movable within the axial bore. The (Continued)

piston includes a piston sealing surface, a first cylindrical portion and a second cylindrical portion. The first cylindrical portion configured to be retained by and slidably engage with the first cavity and the second cylindrical portion configured to be retained by and slidably engage with the second cavity. The piston sealing surface is disposed axially between the first cylindrical portion and the second cylindrical portion.

15 Claims, 3 Drawing Sheets

(56) References Cited

U.S. PATENT DOCUMENTS

| 5,540,258 | A | * | 7/1996 | Cho | F15B 13/015 |
| | | | | | 251/44 |
| 5,875,811 | A | * | 3/1999 | Jacobson | F15B 13/01 |
| | | | | | 251/25 |
| 6,957,660 | B2 | | 10/2005 | Holder | |
| 7,611,125 | B2 | | 11/2009 | Ott | |
| 8,240,291 | B2 | * | 8/2012 | Ibrahim | F02M 63/005 |
| | | | | | 123/458 |
| 9,228,668 | B2 | | 1/2016 | Simpson | |
| 10,006,476 | B2 | | 6/2018 | Bannon et al. | |
| 10,253,852 | B2 | | 4/2019 | Fischer et al. | |
| 11,204,103 | B2 | | 12/2021 | Kumar | |
| 11,274,756 | B2 | | 3/2022 | Tanizaki | |
| 2016/0273668 | A1 | | 9/2016 | Trotzko | |

FOREIGN PATENT DOCUMENTS

| EP | 1403509 A2 | 3/2004 |
| EP | 1403509 A3 | 1/2005 |

OTHER PUBLICATIONS

Abstract for CN108413085 (A), Published: Aug. 17, 2018, 1 page.
European Search Report for Application No. 23198370.1, mailed Feb. 27, 2024, 12 pages.

* cited by examiner

VALVE

CROSS-REFERENCE TO RELATED APPLICATIONS

This application claims the benefit of European Patent Application No. 23198370.1 filed Sep. 19, 2023, the disclosure of which is incorporated herein by reference in its entirety.

TECHNICAL FIELD

The invention relates to valves, more particularly, to valve members and valve seats for hydraulic lift valves and pressure relief valves.

BACKGROUND

Exemplary embodiments pertain to the art of fluid systems and, in particular, to a pressure relief valve to prevent over-pressure in a line of a hydraulic fluid filtration system.

The flow of fluid in lines of a hydraulic fluid system is turned on and off by flow control valves (e.g., solenoid valves). In some systems, one or more flow control valves may control the flow of pressurised fluid to a first destination (e.g., a hydraulic fluid supply line) and to a second destination (e.g., a hydraulic fluid reservoir) along a line that bypasses the first destination.

If the flow control valves are closed or blocked, a build-up of pressure in the system may create problems, such as leaks or pump surge. Accordingly, one or more pressure relief valves (PRVs) are incorporated to maintain system pressure within specified limits. This protects the system from overload conditions due to over-pressurization. Typically, PRV design is based on metallic sealing in which a spring-loaded ball is held against a metallic seat (see, e.g., U.S. Pat. No. 7,611,125B2, U.S. Pat. No. 10,253,852B2 or U.S. Pat. No. 11,274,756B2). Other designs have employed pistons which axially translate once a breaking pressure is reached.

However, these established valve designs have been found to be unstable at pressures close to the relief pressure, resulting in them operating (opening and closing) at high frequencies and thereby causing excess noise and vibration throughout the system. The ball in the spring-loaded ball design may also be dislodged in high vibration or high impact operations resulting in the valve jamming in the open position. Similarly, valve pistons may tilt instead of translating axially (i.e., the opening may be misaligned), thereby causing wear, excess noise and vibration throughout the system.

There is, therefore, a need to provide a more reliable valve.

SUMMARY

In an aspect of the invention an assembly for a pressure relief valve is provided, the assembly comprising a valve seat member, a piston and a fluid outlet. The valve seat member includes a fluid inlet, a seat sealing surface and an axial bore. The axial bore includes a first cavity and a second cavity. The seat sealing surface is disposed axially between the first cavity and the second cavity, and the fluid inlet (or, e.g., a sense cavity or chamber) is disposed (or communicates with an opening) axially between the seat sealing surface and the second cavity. The piston is movable within the axial bore. The piston includes a piston sealing surface, a first cylindrical portion and a second cylindrical portion.

The first cylindrical portion configured to be retained by and slidably engage with the first cavity and the second cylindrical portion configured to be retained by and slidably engage with the second cavity. The piston sealing surface is disposed axially between the first cylindrical portion and the second cylindrical portion. The piston has a first position in which the piston sealing surface is engaged with the seat sealing surface such that a fluid path between the fluid inlet and the fluid outlet is closed, and a second position in which the fluid path between the fluid inlet and the fluid outlet is open. The first cylindrical portion has a first radius, the second cylindrical portion has a second radius and the second radius is less than the first radius. The arrangement of first and second cylindrical portions retained in first and second cavities on either axial side of piston sealing surface ensures that the piston is held in alignment on both axial sides of the piston sealing surface. The piston is thusly prevented from tilting and held in axial alignment with the valve seat member during operation.

A sense cavity or chamber (e.g., leading from or otherwise fluidly coupled to the fluid inlet) may be disposed axially between the seat sealing surface and the second cavity. The sense cavity may be defined in part by a sealing interface provided by the seat sealing surface and the piston sealing surface.

The piston may optionally comprise a piston bore that passes axially through the first cylindrical portion. The fluid outlet may be formed by the piston bore. Directing the fluid through a piston bore (e.g., a central axial bore) may stabilise the operation of the piston (e.g., promote axial translation and prevent the piston tilting or opening unevenly).

The fluid outlet may optionally be formed by one or more grooves in a radially outer surface of the first cylindrical portion. The fluid outlet may optionally be formed in the valve seat member (e.g., axially between the first cylindrical portion and a sealing interface provided by the seat sealing surface and the piston sealing surface).

A first radial clearance between the first cavity and the first cylindrical portion may optionally be less than 25 micrometres. The first radial clearance may be between 15 and 25 micrometres. In this way the movement of the piston may be optimised while limiting the potential for leakage around the first cylindrical portion.

The axial bore may optionally include a dampening cavity (e.g., a closed space or volume which does not include a through-hole or other opening allowing the throughflow of fluid) having a damping volume. The second cylindrical portion may be disposed between the fluid inlet and the dampening cavity (e.g., the second cylindrical portion may be positioned to seal or close off the damping volume). The damping cavity may be configured to stabilise the operation (the axial movement) of the piston by damping the frequency of movement of the piston (e.g., damping the rate or frequency at which the valve may open and close). The damping volume may be configured to dampen oscillations of the piston. Damping or reducing the rate of oscillation may stabilise the valve operation, reduce noise and improve the longevity of the valve.

A second radial clearance between the second cavity and the second cylindrical portion may be configured to restrict flow of fluid into and out of the damping volume. The second radial clearance may optionally be less than 35 micrometres. The second radial clearance may be between 25 and 35 micrometres. The second radial clearance may be configured to control the rate of fluid flowing or leaking into and out of the dampening cavity to stabilise and dampen the movement of the piston (e.g., damping the rate or frequency at which the valve may open and close).

The piston may optionally include a third cylindrical portion disposed axially between the first cylindrical portion and the second cylindrical portion. The third cylindrical portion may have a third radius. The third radius may be larger than second radius and less than first radius. The third cylindrical portion may comprise the piston sealing surface. Providing a stepped or reducing radii configuration of the piston in this way allows the piston to be formed in a single machining operation or configuration and may simplify assembly of the assembly.

The axial bore may optionally include a third cavity surrounding the third cylindrical portion. The third cavity may comprise a compensating or dispersing volume surrounding the third cylindrical portion. The compensating volume may be configured to allow the pressure of the fluid passing through a sealing interface to dissipate or equalise such that it does not act on the first cylindrical portion of the piston (e.g., jet against a surface of the first cylindrical portion). This may stabilise the operation of the piston and improve the response time of the assembly (e.g., by preventing the piston from being undesirably held open by the force of fluid flowing through the valve).

The valve seat member and the piston may optionally be formed from stainless steel. The stainless steel may comprise 440-series stainless steel, such as 440C stainless steel. The use of 440-series steal may allow for low friction operation of the valve thereby stabilising its operation (e.g., allowing for smooth opening and closing at the breakthrough pressure).

In an aspect of the invention a valve is provided, the valve comprising a body, an inlet, an outlet, an assembly comprising a valve seat member, a piston and a fluid outlet, and a resilient member configured to bias the piston against the valve seat member. The valve seat member includes a fluid inlet, a seat sealing surface and an axial bore. The axial bore includes a first cavity and a second cavity. The seat sealing surface is disposed axially between the first cavity and the second cavity and the fluid inlet is disposed axially between the seat sealing surface and the second cavity. The piston is movable within the axial bore. The piston includes a piston sealing surface, a first cylindrical portion and a second cylindrical portion. The first cylindrical portion configured to be retained by and slidably engage with the first cavity and the second cylindrical portion configured to be retained by and slidably engage with the second cavity. The piston sealing surface is disposed axially between the first cylindrical portion and the second cylindrical portion. The piston has a first position in which the piston sealing surface is engaged with the seat sealing surface such that a fluid path between the fluid inlet and the fluid outlet is closed, and a second position in which the fluid path between the fluid inlet and the fluid outlet is open. The first cylindrical portion has a first radius, the second cylindrical portion has a second radius and the second radius is less than the first radius. The fluid inlet is in communication with the inlet of the valve and the fluid outlet is in communication with the outlet of the valve.

The assembly comprising the valve seat member, the piston and the fluid outlet may be discrete from the body. Providing a discrete assembly (e.g., a discrete valve sealing assembly) allows for materials of different parts of the valve to be tailored for specific requirements (e.g., weight, corrosion, thermal or mechanical strength requirements). For example, the body and the valve seat member may comprise different materials. The valve seat member may also be replaced during maintenance operations while the body is maintained and reused.

The body may optionally be integrated with the valve seat member. In this way the valve seat member and body may be formed from the same material and formed in a single machining operation.

The valve may optionally comprise a spring guide. The spring guide may axially align the force applied by the resilient member on to the piston. The spring guide may comprise a conical, frustoconical or spherical surface configured to engage with a guide surface of the piston. The guide surface may be conical or frustoconical. The provision of frustoconical or spherical surfaces may allow the spring guide to self-align with the piston thereby stabilising the operation of the piston. The spring guide may allow the arrangement to self-correct and re-align in the event of misalignment due to impact or high vibration use.

In an aspect of the invention a filtration system for filtering hydraulic fluid is provided, the system comprising a pressurised fluid source, a fluid reservoir, a controllable valve arranged to selectively communicate the pressurised fluid source with a fluid supply line and the fluid reservoir and a valve. The valve comprises a body, an inlet, an outlet, an assembly comprising a valve seat member, a piston and a fluid outlet, and a resilient member configured to bias the piston against the valve seat member. The valve seat member includes a fluid inlet, a seat sealing surface and an axial bore. The axial bore includes a first cavity and a second cavity. The seat sealing surface is disposed axially between the first cavity and the second cavity and the fluid inlet is disposed axially between the seat sealing surface and the second cavity. The piston is movable within the axial bore. The piston includes a piston sealing surface, a first cylindrical portion and a second cylindrical portion. The first cylindrical portion configured to be retained by and slidably engage with the first cavity and the second cylindrical portion configured to be retained by and slidably engage with the second cavity. The piston sealing surface is disposed axially between the first cylindrical portion and the second cylindrical portion. The piston has a first position in which the piston sealing surface is engaged with the seat sealing surface such that a fluid path between the fluid inlet and the fluid outlet is closed, and a second position in which the fluid path between the fluid inlet and the fluid outlet is open. The first cylindrical portion has a first radius, the second cylindrical portion has a second radius and the second radius is less than the first radius. The fluid inlet is in communication with the inlet of the valve and the fluid outlet is in communication with the outlet of the valve. The valve is arranged to communicate the pressurised fluid source with fluid reservoir when a differential pressure between the pressurised fluid source and the fluid reservoir exceeds a predetermined pressure threshold.

The arrangement of the valve may prevent damage to the filtration system by ensuring that the pressure within the system is maintained within a target range, for example, if or when the controllable valve or filter is occluded.

Preferred embodiments will now be described, by way of example only, with reference to the drawings.

DETAILED DESCRIPTION

A valve as described below can, for example, be used in a hydraulic or pneumatic fluid system and, in particular, in a line of a hydraulic fluid filtration system.

Figure 1:
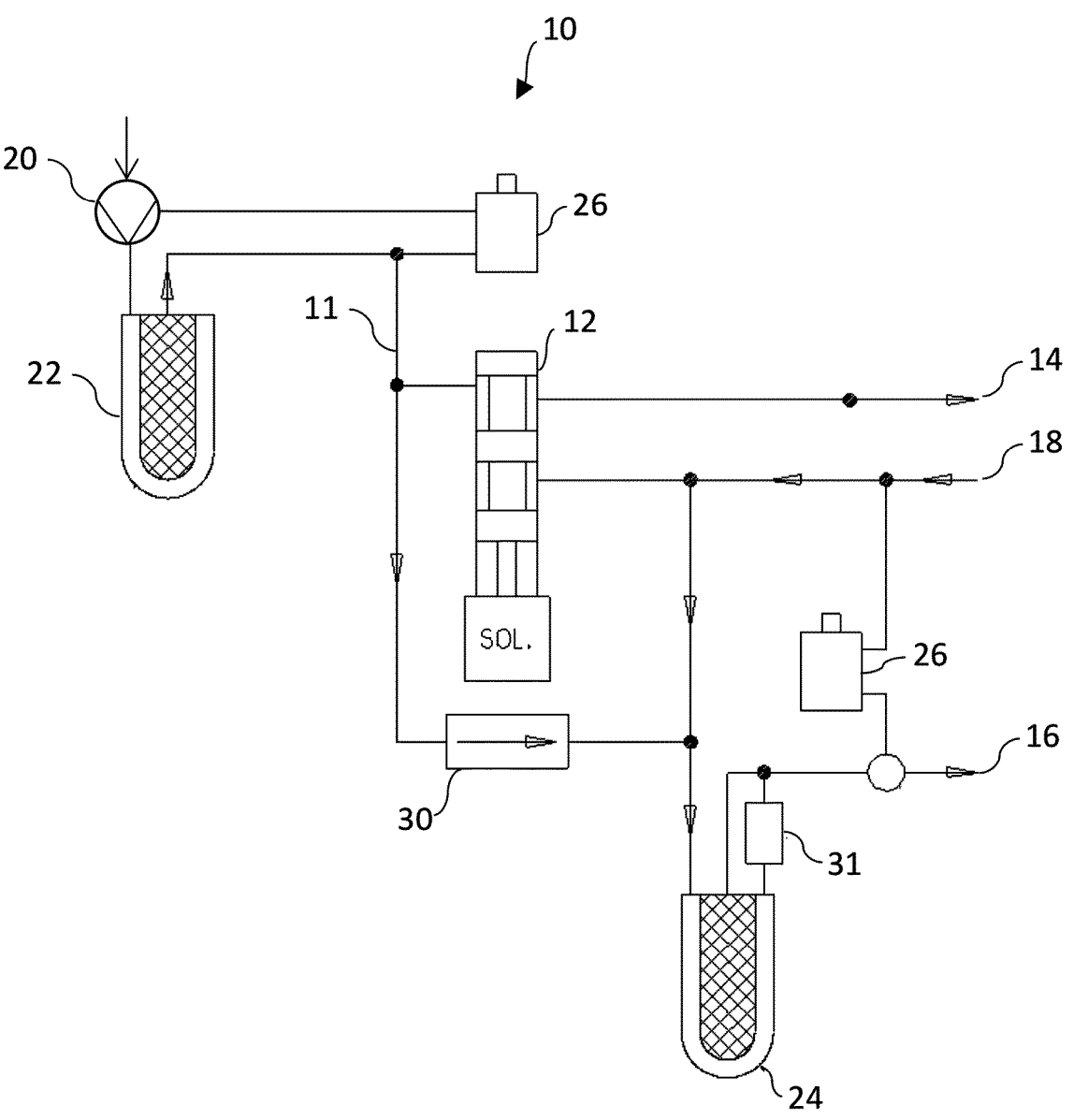
FIG. 1 is a schematic view of an example hydraulic fluid filtration system.

In an example (e.g., as shown in FIG. 1), a filtration system 10 is configured to supply hydraulic fluid (e.g., petroleum based hydraulic fluid, oil, mineral oil, hydraulic oil or brake fluids such as MIL-PRF-5606, MIL-PRF-83282 or MIL-PRF-87257) that is substantially free of particulates (e.g., to an aircraft hydraulic system). A controllable valve, such as a three-way solenoid valve 12, may control the flow of a pressurised fluid from a pressurised fluid source 11 to a first destination 14 (e.g., a hydraulic fluid supply line) when in a first position. The three-way solenoid valve 12 may control the flow of the pressurised fluid from the pressurised fluid source 11 along a line that bypasses the first destination 14 to a second destination 16 (e.g., a hydraulic fluid or oil reservoir) when in a second position. The second destination 16 may be further coupled with a flow of pressurised fluid returning from the first destination 14 (e.g., a hydraulic fluid return line 18). The pressurised fluid from the pressurised fluid source 11 may be provided by a pump 20 (e.g., a pump connected to the hydraulic fluid reservoir 16). The flow of pressurised fluid from the pump 20 may be passed through a filtration system 22 (e.g., a first or supply filter) prior to being supplied to the three-way solenoid valve 12. The flow to the second destination 16 (e.g., fluid from the three-way solenoid valve 12 and/or the hydraulic fluid return line 18 passing to the hydraulic fluid reservoir 16) may be passed through a filtration system 24 (e.g., a second or return filter). Various differential pressure indicators 26 may be provided to give a visual or other indication when the filtration system(s) are substantially blocked or occluded.

A valve 30 (e.g., a hydraulic lift valve or a pressure relief valve) is provided along a line between the pressurised fluid source 11 and the second destination 16 that bypasses the three-way solenoid valve 12. The valve 30 may be arranged to communicate the pressurised fluid source 11 with hydraulic fluid reservoir 16 when a differential pressure between the pressurised fluid source 11 and the fluid reservoir 16 exceeds a predetermined pressure threshold.

A valve 31 (e.g., a hydraulic lift valve or a pressure relief valve) may also be provided along a line between the three-way solenoid valve 12 and the second destination 16 that bypasses the filtration system 24 (e.g., the second or return filter). The valve 31 may be arranged to communicate the hydraulic fluid return line 18 with the hydraulic fluid reservoir 16 when a differential pressure across the filtration system 24 exceeds a predetermined pressure threshold.

Figure 2:
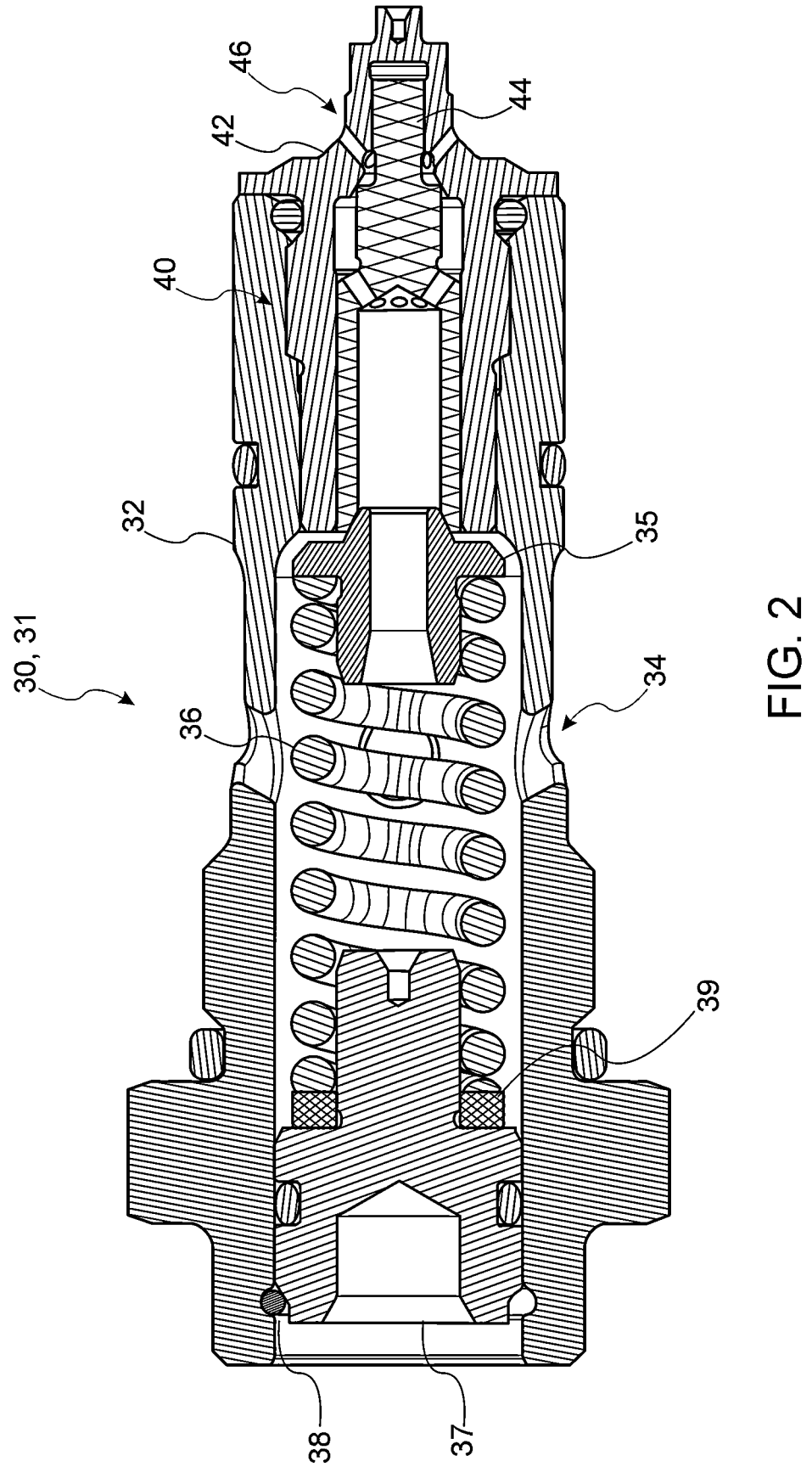
FIG. 2 is a sectional view of an example valve.

One or both of the valves 30, 31 may have a construction as illustrated in FIG. 2. In this example, the valve 30, 31 comprises a body 32, an inlet 46, an outlet 34, a valve seat, a piston 44 and a resilient member (e.g., a spring 36) configured to bias the piston 44 against the valve seat.

Figure 3:
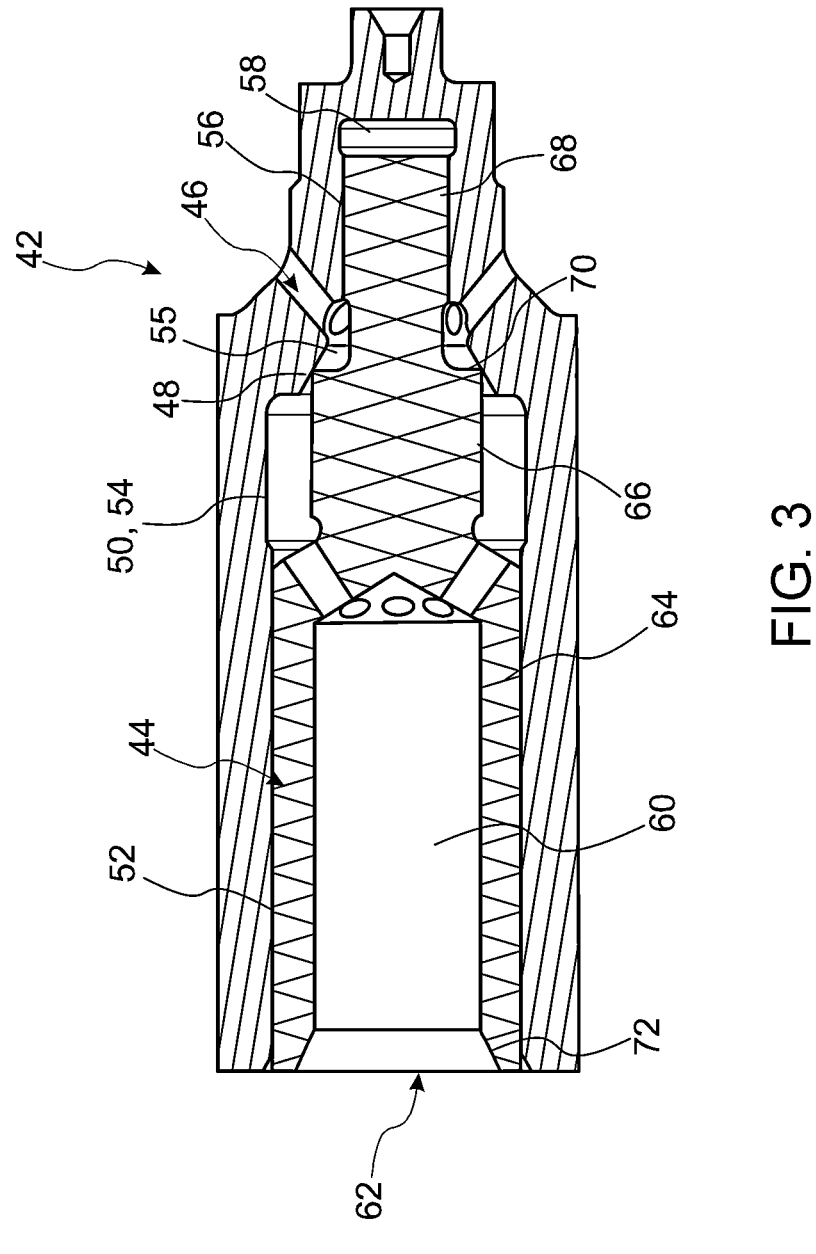
FIG. 3 is a sectional view of an example valve sealing assembly.

In the example shown, the valve 30, 31 comprises a discrete assembly 40 (e.g., a valve sealing assembly, as shown in FIG. 3) including a valve seat member 42 (having the valve seat) and a piston 44 movably engaged in the valve seat member 42. The assembly 40 may be mounted within a body 32 of the valve 30, 31. Alternatively, the valve 30, 31 may be integral such that no discrete valve sealing assembly 40 is provided. That is, the valve seat member 42 may be integral to the body 32 of the valve 30, 31 and the piston 44 may be movably engaged in the body 32.

Providing a discrete valve sealing assembly 40 allows for materials of different parts of the valve 30 to be tailored for specific requirements (e.g., weight, corrosion, thermal or mechanical strength requirements). For example, the valve seat member 42 may be formed of one material, while the body 32 may be formed of another material. A discrete valve sealing assembly 40 may also be replaced as needed (e.g., due to wear of the moving parts) while the valve body 32 may be retained and reused. In a preferred example, the valve seat member 42 may be formed of a high strength and/or low friction material. The body 32 may be formed from a lightweight material. The valve seat member 42 and/or the piston 44 may be formed of low friction steel (e.g., 440C stainless steel). The body 32 may be formed from aluminium or aluminium alloy.

With additional reference to FIG. 3, the valve seat member 42 includes a fluid inlet 46 (e.g., the valve seat member 42 includes the inlet 46 of the valve 30, 31), a seat sealing surface 48 and an axial bore 50 (having an axis). The axial bore 50 includes a first cavity 52 and a second cavity 56. The first and second cavity may each be generally cylindrical. The seat sealing surface 48 is positioned between (e.g., axially between) the first cavity 52 and the second cavity 56. The fluid inlet 46 is positioned axially between the seat sealing surface 48 and the second cavity 56. That is, the fluid inlet 46 opens into a sense cavity 55 which is between the seat sealing surface 48 and the second cavity 56.

The piston 44 is arranged in and axially movable along the axial bore 50 of the valve seat member 42. The piston 44 includes a piston sealing surface 70, a first cylindrical portion 64 and a second cylindrical portion 68. The first cylindrical portion 64 is configured (e.g., sized or machined) to be retained by and slidably engage with the first cavity 52 and the second cylindrical portion 68 configured (e.g., sized or machined) to be retained by and slidably engage with the second cavity 56.

The first cylindrical portion 64 has a first radius, the second cylindrical portion 68 has a second radius, and the second radius is less than the first radius. Each of the first and second cylindrical portions 64, 68 are held and guided by the respective first and second cavities 52, 56 in order to stabilise and axially align the piston 44 within the axial bore 50. In particular, the piston 44 is held in alignment at opposing sides of an axially facing sealing interface provided by the piston sealing surface 70 and the seat sealing surface 48.

A fluid outlet 62 is provided on an opposite side (e.g., axially opposite) of the piston sealing surface 70 or the seat sealing surface 48 relative to the fluid inlet 46. That is, the sealing interface provided by the piston sealing surface 70 and the seat sealing surface 48 is positioned between (e.g., axially between) the fluid inlet 46 and the fluid outlet 62. In the illustrated example, the piston 44 includes a fluid outlet 62 which may subsequently lead to the outlet 34. The fluid outlet 62 passes or extends through or adjacent the first cylindrical portion 64 (e.g., from the piston sealing surface 70 and seat sealing surface 48 to a valve outlet 34). In the illustrated example, the piston 44 comprises a piston bore 60 that passes axially through the first cylindrical portion 64 and the fluid outlet 62 is provided by the piston bore 60. Alternatively, the fluid outlet 62 may be formed by one or more grooves in a radially outer surface of the first cylindrical portion 64 or the fluid outlet 62 may be provided in the valve seat member 42 such as, for example, in the first cavity 52 or third cavity 54 (not shown).

In a preferred example, the piston includes a third cylindrical portion 66 disposed axially between the first cylindrical portion 64 and the second cylindrical portion 68. The third cylindrical portion 66 has a third radius which is larger than second radius and less than first radius (i.e. an intermediate radius).

The piston sealing surface 70 is positioned axially between the first cylindrical portion 64 and the second cylindrical portion 68 and configured to mate with (i.e., face and contact) the seat sealing surface 48 of the valve seat member. The piston sealing surface 70 may be provided by an edge of the third cylindrical portion 66. In example shown, the piston sealing surface 70 is generally axially facing (e.g., an end face of the third cylindrical portion 66), although other configurations are also contemplated. For example, the piston sealing surface 70 may be frustoconical or frustospherical in shape and/or the seat sealing surface 48 may comprise a sealing edge.

During operation, the piston 44 has a first position (e.g., a normal or resting position) wherein the piston sealing surface 70 is engaged with the seat sealing surface 48 such that a fluid path between the fluid inlet 46 or sense cavity 55 and the fluid outlet 62 is closed and a second position (e.g., an open position) wherein the fluid path between the fluid inlet 46 and the fluid outlet 62 (and in turn the outlet 34) is open.

As is known in the art, in order to move the piston 44 to the second or open position, pressure from the fluid inlet 46 is communicated to the sense chamber 55 which acts on the piston 44, adjacent the piston sealing surface 70. When the pressure in the sense chamber 55 exceeds the breakthrough pressure of the valve 30, the force acting on the piston 44 will exceed the closing force provided by the resilient member 36, thereby causing the piston 44 to move from the first position to the second position.

The arrangement of first and second cylindrical portions 64, 68 retained in first and second cavities 52, 56 on either axial side of piston sealing surface 70 ensures that the piston is held in alignment on both axial sides of the piston sealing surface 70. The piston 44 is thusly prevented from tilting and held in axial alignment with the valve seat member 42 during operation.

The stepped or reducing radius configuration of the piston 44 also facilitates greater ease of manufacture as a single manufacturing operation may be used to manufacture the first and second cylindrical portions 64, 68 and the piston sealing surface 70 (e.g., a single lathe configuration).

In an example, a first radial clearance between the first cavity and the first cylindrical portion may be less than 25 micrometres, or between 15 and 25 micrometres. This relatively small clearance (optionally in combination with the use of a low friction material) optimises the alignment of the piston within the valve seat member whilst allowing smooth operation and minimising fluid leakage around the piston.

In the illustrated example, the axial bore also includes a dampening cavity 58 axially beyond the second cavity 56 (e.g., positioned beyond the axial extent of the second cylindrical portion 68 of the piston 44). When in the closed position, the second cylindrical portion 68 is positioned between the fluid inlet 46 or sense cavity 55 and the dampening cavity 58 such that the dampening cavity 58 is configured to be sealed by the second cylindrical portion 68. That is, the dampening cavity 58 has no other fluid inlet other than fluid which passes or leaks around the second cylindrical portion 68 and through the second cavity 56.

The dampening cavity 58 (when provided) comprises a damping volume which is configured to be filled with fluid from the fluid inlet 46 (e.g., hydraulic fluid). The dampening cavity 58 acts to dampen the movement (e.g., cushion or otherwise slow) of the piston 44 so that the operation of the valve can be further smoothened. In particular, the damping volume may be configured to dampen oscillations of the piston 44 as it may add resistance to rapid movement of the piston 44 and thereby prevent rapid oscillations or fluttering of the piston 44. This may reduce wear on the piston 44 and valve seat member 42 or body 32 of the valve, and serve to reduce excess noise caused by high frequency oscillations.

A second radial clearance between the second cavity 56 and the second cylindrical portion 68 may be configured to allow passage of a portion of fluid to the dampening cavity 58 and, more particularly, to control or limit the rate at which fluid may pass or leak around the second cylindrical portion 68 into and out of the dampening cavity 58. In an optimised example, the second radial clearance is less than 35 micrometres or between 25 and 35 micrometres. The damping volume may also be tailored to fine tune the frequency response of the piston 44 and/or valve 30, 31. In an optimised example, the hydraulic fluid, damping volume and/or second radial clearance is selected to damp oscillations of the piston 44 above 30 Hz. In an example, the damping volume may be between 8.5 and 110 mm3 (0.0085-0.110 ml).

The axial bore 50 may include a third cavity 54 surrounding the third cylindrical portion 66. The third cavity 54 may comprise a compensating volume surrounding the third portion 66 such that the third portion is not retained by (e.g., not engaged with) the third cavity 54 and can instead translate freely within the third cavity 54 (whilst still being held in axial alignment with the axial bore 50 by the first and second cylindrical portions 64, 68). The compensating volume is configured to dampen pressure changes within the valve 30. In particular, the fluid may form a jet of fluid when the valve 30 moves to the open position which may act on the face of the first cylindrical portion 64 of the piston 44, thereby holding the piston 44 in the open position for a prolonged period and/or increasing the instability of the valve's operation. The compensating volume of the third cavity 54 acts to disperse the jet of fluid which may be formed when the valve 30 opens such that it does not undesirably act on (e.g., apply an unmetered additional force or pressure to) the piston 44. In this way the operation of the valve 30 is further stabilised and/or dampened.

In the illustrated example, the valve 30, 31 further comprises a spring guide 35. The spring guide 35 acts to axially align the force applied by the resilient member on to the piston 44. The spring guide 35 is preferably made of a low friction material and may be made of the same material as the piston 44. The spring guide may comprise a conical, frustoconical or spherical surface configured to engage with a guide surface 72 of the piston 44. The guide surface 72 of the piston 44 may be conical or frustoconical. The provision of frustoconical or spherical surfaces allows the spring guide 35 to self-align with the piston 44. For example, in a high vibration or high impact scenario, the spring guide 35 may temporarily become dislodged from the piston 44. In this situation, the frustoconical or spherical surfaces, along with a driving force from the resilient member, would bias the spring guide 35 back into place, partially nested within the piston.

The breakthrough pressure of the valve 30, 31 may be controlled by the selection and calibration of the resilient member. For example, the strength of a spring 36 may be selected for a particular application and breakthrough pressure. The valve 30, 31 may then be set by installing the spring 36 with a sealing nut 37 and a locking ring 38. The actual breakthrough pressure may then be measured and the breakthrough pressure of the valve 30, 31 may be adjusted to a target value by installing one or more adjustment shims 39.

The breakthrough pressure (the pressure difference between the fluid inlet 46 and the fluid outlet 62 required to lift the piston 44) may depend on the specific operating conditions of system in which the valve 30, 31 is installed. In an example, the operating pressure of the system may be approximately 10 MPa (e.g., 10.3 MPa) and the valve may be configured to maintain the operating pressure (i.e., the breakthrough pressure may be set to approximately 10 MPa). Alternatively, the valve 30, 31 may be configured to open when a pressure in the system exceeds the operating pressure. For example, the normal or target operating pressure of the system may be approximately 10 MPa (e.g., 10.3 MPa) and the breakthrough pressure may be 16.5 MPa. The valve may be configured such that (e.g., the fluid inlet 46 and fluid outlet 62 may be sized such that) a flow rate (e.g., the flow rate when the valve is fully open) of between 20 and 25 l/min (e.g., 22.7 l/min) is achieved when the pressure differential is 16.5 MPa. In an example, the maximum leakage rate may be 4.5 ml/min when the pressure differential is 11.3 MPa. The proof pressure of the valve 30, 31 may be between 20-30 MPa (e.g., 25.8 MPa) and the burst pressure may be between 40-50 MPa (e.g. 43.1 MPa).

Although this disclosure has been described in terms of preferred examples, it should be understood that these examples are illustrative only and modifications and alterations are possible within the scope of the claims.

The invention claimed is:

1. An assembly for a pressure relief valve, comprising:
a valve seat member including:
a fluid inlet;
a seat sealing surface; and
an axial bore, the axial bore including a first cavity and a second cavity, wherein the seat sealing surface is disposed axially between the first cavity and the second cavity and the fluid inlet is disposed axially between the seat sealing surface and the second cavity;
a fluid outlet; and
a piston movable within the axial bore, the piston including:
a piston sealing surface;
a first cylindrical portion; and
a second cylindrical portion, the first cylindrical portion configured to be retained by and slidably engage with the first cavity and the second cylindrical portion configured to be retained by and slidably engage with the second cavity, wherein the piston sealing surface is disposed axially between the first cylindrical portion and the second cylindrical portion;
wherein the piston has a first position in which the piston sealing surface is engaged with the seat sealing surface such that a fluid path between the fluid inlet and the fluid outlet is closed, and a second position in which the fluid path between the fluid inlet and the fluid outlet is open; and
wherein the first cylindrical portion has a first radius, the second cylindrical portion has a second radius and the second radius is less than the first radius;
wherein a closed end of the axial bore includes a dampening cavity having a damping volume,
wherein the second cylindrical portion is disposed between the fluid inlet and the dampening cavity, and wherein a second radial clearance between the second cavity and the second cylindrical portion is configured to restrict flow of fluid into and out of the damping volume.

2. The assembly according to claim 1, wherein the piston comprises a piston bore that passes axially through the first cylindrical portion and the fluid outlet is formed by the piston bore.

3. The assembly according to claim 1, wherein the fluid outlet is formed by one or more grooves in a radially outer surface of the first cylindrical portion.

4. The assembly according to claim 1, wherein a first radial clearance between the first cavity and the first cylindrical portion is less than 25 micrometres.

5. The assembly according to claim 4, wherein the first radial clearance is between 15 and 25 micrometres.

6. The assembly according to claim 1, wherein the second radial clearance is less than 35 micrometres.

7. The assembly according to claim 1, wherein the damping volume is configured to dampen oscillations of the piston.

8. The assembly according to claim 1, wherein the piston includes a third cylindrical portion disposed axially between the first cylindrical portion and the second cylindrical portion, the third cylindrical portion having a third radius and comprising the piston sealing surface, the third radius being larger than second radius and less than first radius.

9. The assembly according to claim 8, wherein the axial bore includes a third cavity surrounding the third cylindrical portion, the third cavity comprising a compensating volume surrounding the third cylindrical portion.

10. The assembly according to claim 1, wherein the valve seat member and the piston are formed from stainless steel.

11. A valve comprising:
a body;
an inlet;
an outlet;
an assembly as recited in claim 1, wherein the fluid inlet is in communication with the inlet of the valve and the fluid outlet is in communication with the outlet of the valve; and
a resilient member configured to bias the piston against the valve seat member.

12. The valve according to claim 11, wherein the body is integral with the valve seat member.

13. The valve according to claim 11, further comprising:
a spring guide that comprises a conical, frustoconical or spherical surface configured to engage with a guide surface of the piston.

14. The valve according to claim 13, wherein, the guide surface is conical or frustoconical.

15. A filtration system for filtering hydraulic fluid comprising:
a pressurised fluid source;
a fluid reservoir;
a controllable valve arranged to selectively communicate the pressurised fluid source with a fluid supply line and the fluid reservoir; and
a valve according to claim 11;
wherein the valve is arranged to communicate the pressurised fluid source with fluid reservoir when a differential pressure between the pressurised fluid source and the fluid reservoir exceeds a predetermined pressure threshold.

\* \* \* \* \*